Dec. 10, 1963     F. A. JESSEN, JR     3,114,149
COMBINED RADAR AND INFRA-RED CONICAL SCANNING ANTENNA
Filed Dec. 4, 1961
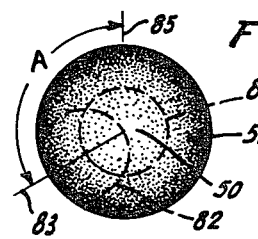
FIG. 4A.
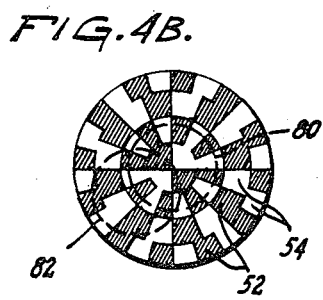
FIG. 4B.
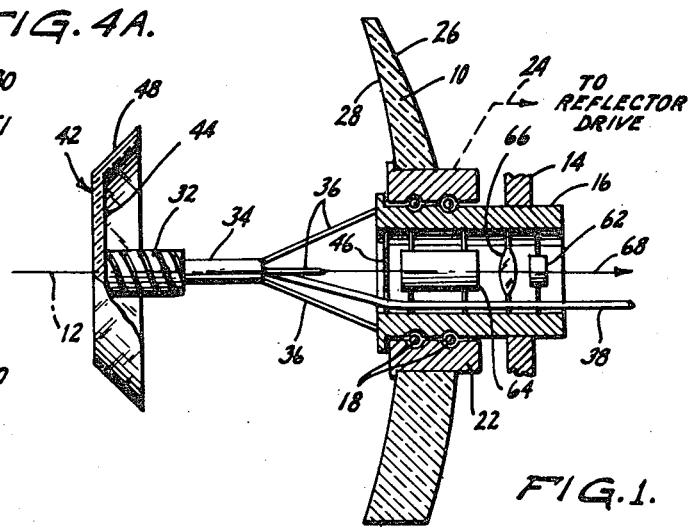
FIG. 1.
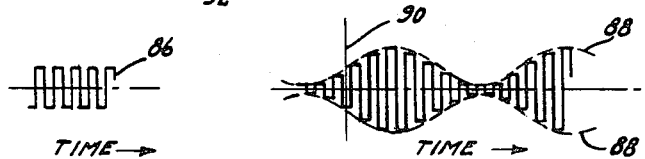
FIG. 5A.     FIG. 5B.
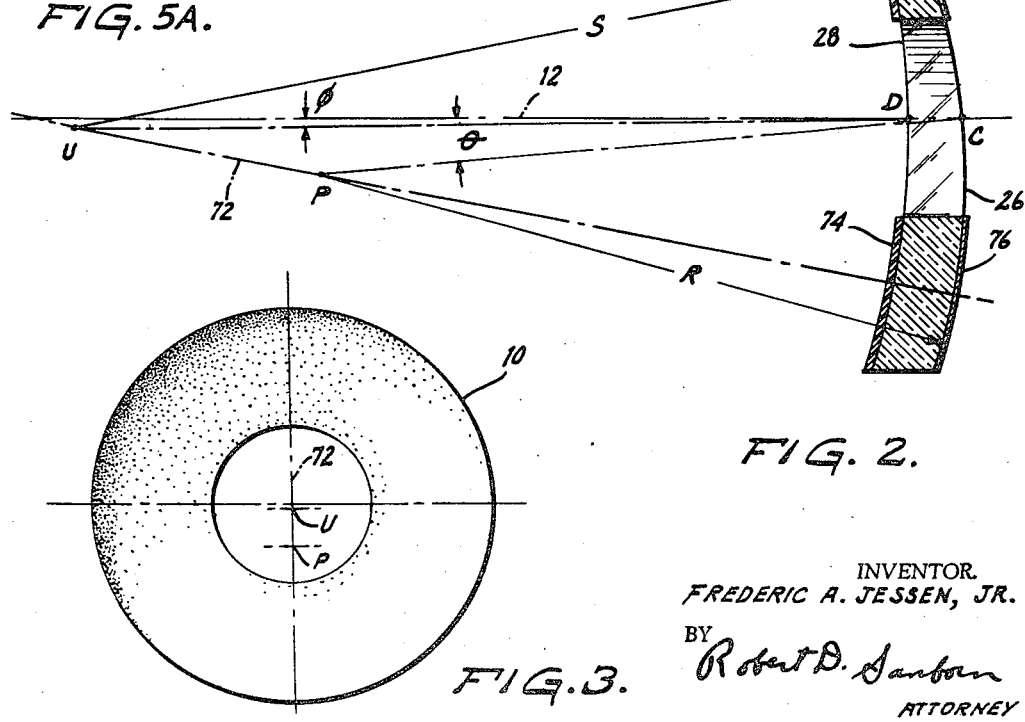
FIG. 2.
FIG. 3.
INVENTOR.
FREDERIC A. JESSEN, JR.
BY
*Robert D. Sanborn*
ATTORNEY

United States Patent Office 3,114,149
Patented Dec. 10, 1963

3,114,149
COMBINED RADAR AND INFRA-RED CONICAL SCANNING ANTENNA
Frederic A. Jessen, Jr., Levittown, Pa., assignor to Philco Corporation, Philadelphia, Pa., a corporation of Delaware
Filed Dec. 4, 1961, Ser. No. 156,715
12 Claims. (Cl. 343—720)

The present invention relates to target locating systems and more particularly to antenna systems for dual frequency conical scanning target locating systems and reflectors therefor.

Many types of missiles are provided with target seeking systems which control and guide the flight path of the missile. In such systems it is necessary to provide an antenna system for receiving target reflected or target generated energy from which the position of the target relative to the flight path of the missile can be determined. One convenient form of antenna system employs a substantially spherical concave reflector for focusing infra-red or other near-visible or visible energy received from the target on a suitable photosensitive sensing device. A reticule or filter having appropriately placed transparent and opaque or semi-opaque areas is positioned between the reflector and the sensing device. Means are provided for producing relative motion between the reticule and the image focused thereon by the reflector. This imparts an amplitude modulation to the energy received by the sensing device from any object within the field of reception of the reflector which does not lie along the axis of the reflector. The phase and amplitude of the modulation is indicative of the position of the object with respect to the axis of the reflector.

In another form of target locating system a spherical or paraboloidal microwave antenna reflector is rotated about an axis making a slight angle with respect to the geometric axis of the reflector. This imparts an amplitude modulation to the target reflected microwave signal received from any object which does not lie along the axis of rotation of the reflector. Systems of this type are referred to as conical scan systems.

In the past both microwave frequency seeker systems and near-visible frequency seeker systems, e.g. infra-red seeker systems, have been employed in missile guidance systems. The infra-red type seeker system has the disadvantage that it may be adversely affected by clouds, flares, the sun or other heat radiating objects in the vicinity of the target. This type of system has the advantage that it is a passive system which does not require the transmission of energy from the missile or from the launching vehicle or launch site. Microwave systems on the other hand generally require transmission as well as reception of energy and are subject to distraction by decoys, etc. However microwave systems are generally not distracted by flares, the sun or the like.

It has been recognized in the past that it would be desirable to provide both an infra-red and a microwave target locating system in the same missile. The chief obstacle to such an arrangement has been that no convenient means was available for providing two non-interfering scanning antenna systems, one for infra-red frequency reception and one for microwave frequency reception, within the same missile.

It is an object of the present invention to provide a scanning antenna system which will receive signals in two widely separated frequency bands, each employing the maximum useable aperture.

Another object is to provide a dual-frequency, conically-scanned antenna system which requires only a single rotary element.

An additional object of the invention is to provide a dual-frequency, conically-scanned antenna system in which there is comparatively wide separation between the locations of the energy detecting elements of the two systems.

A further object is to provide a dual frequency target locating system having the same reference axes for signals at two different frequencies.

Still another object of the present invention is to provide an improved reflector element for dual frequency target locating systems.

In general these and other objects of the invention are achieved by providing a concavo-convex reflector which is rotatable about an axis passing through the center of the reflector. Preferably the concave surface of the reflector and the convex surface of the reflector have different radii of curvature, the centers of curvature being displaced from the axis of rotation but lying within a plane which contains the axis of rotation. The reflector is so formed that reflection of energy at one frequency occurs from the concave face of the reflector while reflection of energy at a different frequency occurs from the convex face of the reflector.

For a better understanding of the present invention together with other and further objects thereof, reference should now be had to the following detailed description which is to be read in conjunction with the accompanying drawings, in which:

FIGURE 1 is a view partially in section of a preferred embodiment of the present invention;

FIGURE 2 is a detailed cross-sectional view of the reflector of the embodiment of FIGURE 1;

FIGURE 3 is a front view of the reflector which forms a part of the embodiment of FIGURE 1;

FIGURES 4A and 4B are views showing the reticule patterns employed to produce modulation of the signal in the infra-red portion of the system; and FIGURES 5A and 5B are plots showing the signals generated by objects within the field of view of the infra-red system.

In FIGURE 1 a concavo-convex reflector 10, which may be formed or fused quartz or other microwave-energy-transmissive substance, is mounted for rotation about an axis 12. In FIGURE 1 member 14 diagrammatically represents the fixed support for reflector 10. Support 14 may be movable in azimuth and elevation with respect to the missile structure or it may be fixed with respect to the missile axis depending upon the type of guidance system employed. However, structure 14 does not rotate with reflector 10. An inner bearing race 16 is mechanically secured to support 14 and carries a double row of ball bearings 18. The outer bearing race 22 may be cemented or otherwise fastened to the reflector 10. It is to be understood that the bearing structure 16—18—22 is shown by way of illustration only and that other forms of bearing structure may be substituted therefor.

Reflector 10 may be rotated about axis 12 in any convenient manner. For example, suitable drive means may be mechanically or magnetically coupled to the outer bearing race 22 or the reflector 10. By way of example, permanent magnets (not shown) may be secured to reflector 10 and/or outer bearing race 22. A suitable rotating field may be provided which will interact with the magnets to rotate reflector 10 about axis 12 in synchronism with the rotating field. Since the means for rotating the reflector does not form a part of the present invention, the reflector drive means is schematically illustrated in FIGURE 1 by the broken arrow 24 and the legend "To Reflector Drive."

As will be explained in more detail in connection with FIGURE 2 the convex or rearward surface 26 of reflector 10 is treated so that it will reflect microwave energy. The forward or concave surface 28 of reflector 10 is treated so that it will pass microwave energy but will reflect infra-red energy.

A helical microwave radiating element 32 is supported substantially at the focus of reflecting surface 26 by means of a hollow supporting tube 34. Supporting tube 34 is secured to inner bearing race 16 by means of three supporting arms 36. The three arms 36 together form a rigid tripod support for tube 34. Microwave energy may be received from or supplied to element 32 by way of microwave cable 38 which passes through the stationary inner bearing race 16 and tube 34.

Also mounted on tube 34 is a secondary reflector 42. The surface 44 of reflector 42 is both reflective of infra-red energy and conductive at microwave frequencies. Therefore it acts both to reflect infra-red energy received from surface 28 of reflector 10 to a reticule 46 and as a ground plane for microwave feed element 32. Secondary reflector 42 may be formed with a flared rim 48 which acts as an extraneous light shield for the surface 44 and to exclude stray radiation from the reticule 46 and from the infra-red detector or photocell 62.

Reticule 46 is supported by inner bearing race 16 in any convenient manner. Reticule 46 is an optical filter which is formed with areas of different density. These areas of different density impart a characteristic amplitude modulation to the energy passing therethrough as the image is moved with respect to reticule 46 by the rotation of reflector 10. A typical reticule may have a density distribution corresponding to the pattern shown in FIG. 4A superimposed on the pattern shown in FIG. 4B. The radially symmetrical pattern shown in FIG. 4A comprises a gradual shading from a nearly transparent area 50 at the center to a nearly opaque area 51 at the periphery of the reticule. This distribution may be approximated by forming a filter or mask with alternate opaque and transparent rings which are so dimensioned that the sum of the width of a transparent ring and the next larger opaque ring is substantially the same for all transparent rings while the width of the opaque rings increases with increasing radius.

The pattern shown in FIG. 4B comprises a plurality of segmented annular bands. Segments 52 are opaque segments while the alternate segments 54 are transparent. One embodiment of the invention employed a reticule 46 having six bands with 4, 16, 16, 24, 24 and 30 segments per band, respectively.

The superposition of the two patterns may be accomplished by superimposing two reticules each having a different one of the two patterns. Alternatively the desired pattern may be formed on a single reticule by photographically or otherwise superimposing the two patterns.

The energy passing through reticule 46 is focused upon an infra-red detector or photocell 62 by means of light pipe 64 and lens 66 which are mechanically affixed to inner bearing race 16. Again the manner in which the image appearing on reticule 46 is focused upon detector 62 is not a part of the present invention and the structure shown should be considered merely as illustrative of one presently preferred arrangement.

The output signal from the infra-red portion of the system is obtained from the output connection 68 of detector 62. The signals present on microwave cable 38 and output connection 68 may be supplied to the respective microwave and infra-red signal processers (not shown) which are carried by the vehicle or missile associated with the antenna structure of FIG. 1.

FIG. 2 is a more detailed view of the reflector 10 shown in FIG. 1. The convex surface 26 of reflector 10 has a radius of curvature R with a center of curvature at point P. The concave surface 28 of reflector 10 has a radius of curvature S and a center of curvature at point U. Preferably points U and P lie on the same straight line 72 which intersects the axis of rotation 12 of reflector 10. This will insure that the two conically scanned systems have the same phase reference. In a typical embodiment of the invention the radius R may be of the order of 5 inches, and the radius S of the order of 6.5 inches. The angle $\theta$ between the axis 12 and the line CP passing through point P and the center of the convex surface 26 may be of the order of 5°. The angle $\phi$ between the line UD passing through point U and the center D of the concave surface 28 may be of the order of 30 minutes of arc. The distance between points C and D may be of the order of $4/10$ of an inch.

The surface 28 of reflector 10 is provided with a multi-layer interference filter 74 which is highly reflective to infra-red energy but is substantially transparent to microwave energy. A suitable filter may be formed by evaporating multiple alternate layers of germanium and cryolyte (sodium aluminum fluoride) in proper thicknesses upon surface 28. The optical design of a suitable infra-red reflecting surface of this type is well known in the optical art and will not be described further herein.

The convex surface 26 of reflector 10 is provided with an aluminized coating 76 which is highly reflective to microwave energy. The thicknesses of coatings 74 and 76 have been greatly exaggerated in FIGURE 2 in order that they might be shown in the drawing. In presently preferred embodiments of the invention each of the coatings has a thickness of the order of several microns.

FIG. 3 is a front view of the reflector 10 only. Parts and features in FIG. 2 corresponding to like parts and features in FIGS. 1 and 2 have been identified by like reference numerals.

The system shown in FIGURE 1 operates in the following manner. Reflector 10 and member 42 together form a modified Cassegrainian telescope which images the infra-red energy received from any object present in the space about axis 12 on reticule 46. The surface 28 of reflector 10 forms the primary mirror and the surface 44 on member 42 forms the second mirror of the Cassegrainian system. Light pipe 64 and lens 66 merely conduct the energy passing through reticule 46 to the photosensitive detector 62. Detector 62 responds to the total amount of energy passing through reticule 46 without regard to the area of the reticule through which the energy passes.

The rotation of reflector 10 about the axis 12 which makes an angle $\phi$ with the axis of rotational symmetry of surface 28 produces a circular translation (not rotation) of the image formed on reticule 46. That is, the image formed on reticule 46 will travel in a circle once for each revolution of reflector 10. The circles described by image points are all of the same size but have different centers. The image point of an object in space located on the axis 12 will describe a circle such as circle 80 in FIGURES 4A and 4B which has its center at the center of reticule 46. The image point of an object in space which lies on the cone described by the optical axis, i.e. axis of symmetry UD of surface 28 will describe a circle 82 which has the same diameter as circle 80 but which passes through the center of reticule 46. The image points of objects which lie between the imaginary cone generated by the optical axis UD and the axis of revolution 12 will trace circles which enclose the center of the reticule 46 but which are not concentric therewith. The angle A formed by a line 83 through the center of image circle 82 and the center of reticule 46 with a reference direction 85 on reticule 46 corresponds to the angle formed by the plane which includes the object represented by the image circle 82 and axis 12 with the reference plane of the missile, for example the plane of the drive coils for reflector 10.

The function of the pattern shown in FIG. 4B is to amplitude modulate the energy received by detector 62 at a relatively high rate which is substantially independent of the position of the image circle on reticule 46. This converts the constant energy input representative by an image point or image circle on reticule 4 to a modulated signal at the detector 62. Therefore the signal provided by detector 62 can be amplified in a conventional A.-C. signal amplifier. The function of the pattern shown in FIG. 4A is to provide a characteristic, lower-frequency amplitude modulation of the energy received from objects off the axis 12.

It will be seen that image circle 80 in FIG. 4A lies along a line of equal density of the pattern of FIG. 4A. Hence the energy falling on detector 62 will be attenuated as a result of the pattern of FIG. 4A but the attenuation is not a function of the angle of rotation of reflector 10. The pattern of FIG. 4B will amplitude modulate or chop the signal at a rate determined by the number of segments in the band occupied by image circle 80 and the speed of rotation of reflector 10. Typically the signal may be chopped at a frequency of the order of 600 to 1,000 cycles per second. The time variation in the intensity of the energy falling on detector 62 from a target on the axis 12 will approximate the square wave 86 of FIGURE 5A.

The chopping action of the pattern of FIGURE 4B for image circle 82 will depart somewhat from the symmetrical square wave pattern 86 of FIGURE 5A. In general this departure will appear as a frequency modulation of the carrier wave component represented by square wave 86. This does not adversely affect the operation of the target location or missile guidance system associated with the antenna of FIG. 1 since the modulation produced by the pattern of FIGURE 4B is not employed in determining the position of the target with respect to the missile. Therefore, for purposes of this description, it will be assumed that the frequency of "carrier wave 86" of FIGURE 5A does not change with changes in the position of image circles on reticule 46.

It will be seen that image circle 82 passes through the nearly opaque region 51 and the nearly transparent region 50 of reticule 46 once for each revolution of reflector 10. Thus the signal received by detector 62 after passing through reticule 46 will have a lower-frequency amplitude modulation the envelope of which is represented by the broken lines 88 of FIG. 5B.

The phase of the envelope 88 with respect to some reference 90 will depend upon the position of the center of circle 82 with respect to line 85 in FIGS. 4A and 4B—that is, it will be representative of the magnitude of angle A. As explained above the position of the center of circle 82 with respect to line 85 is directly representative of the position of the target or object represented by the image circle 82 with respect to an arbitrarily selected reference plane through the missile. The percentage or degree of modulation of the carrier waveform 86 is proportional to the angular displacement of the infra-red target from the reflector spin axis 12, that is, proportional to the linear displacement of the center of the image circle 82 from the intersection of axis 12 with the reticule 46. Thus directional error signal information for controlling the flight path of the missile carrying the antenna system of FIGURE 1 can be obtained by amplitude detecting the signal supplied by detector 62 to remove the carrier wave component introduced by the pattern of FIGURE 4B, and then phase detecting the resultant signal.

The antenna feed element 32 and microwave reflecting surface 26 together form a conventional conical scan radar antenna system. Helical element 32 together with reflecting surface 44 form the primary feed for supplying microwave energy to, or receiving microwave energy from reflecting surface 26. Since the axis of symmetry of surface 26 is displaced by an angle $\theta$ from the axis of revolution 12 of reflector 10, radar targets positioned along axis 12 will cause a constant amplitude signal to be present on output cable 38 of the microwave system. For targets lying off the axis 12 the signal returned will be amplitude modulated at a phase determined by the position of the target with respect to selected reference plane of the missile. Since the centers of curvature U and P of surfaces 28 and 26 lie in the same plane, the signal at the output 68 of detector 62 and the signal supplied on output cable 38 of the microwave system can provide identical target signal phase information.

The means by which the signals from detector 62 and output cable 38 are employed to control the flight of a missile lie outside the scope of the present invention. However, by way of illustration, the microwave system of the missile may be employed for the initial long range acquisition of the target and the infra-red system, having its output at connection 68, may be employed for the terminal portion of the flight of the missile to the target. Alternatively the control system may be responsive to both the signals supplied by the infra-red and microwave systems, with means being provided for eliminating one of these signals in case of conflict in the information supplied.

It will be apparent that various modifications and other embodiments which lie within the scope of the invention will occur to those skilled in the art. For example, in the embodiment shown the surfaces 26 and 28 may be paraboloidal rather than spherical. Reticule 46 may have patterns differing from those shown in FIGS. 4A and 4B. Other forms of microwave feed means may be substituted for feed element 32 and reflecting surface 44. The curvatures of the concave and convex surfaces of the reflector 10 are independent of one another so that the focal lengths and the conical scan angles for the two frequencies may be independently selected. In addition the centers U and P and axis 12 need not lie in a common plane.

In still another embodiment of the invention the center of curvature U of surface 28 may be located on axis 12 thereby to provide a stationary infra-red image on reticule 46. A rotating reticule pattern (episcotister) is employed to produce the desired modulation of the received energy. The control system of the missile or carrying vehicle may be simplified if the reticule (episcotister) rotates in synchronism with reflector 10 but this is not essential. A suitable reticule pattern for a system of this type comprises a disc on which one 180° sector has a uniform 50% transmission factor and the remaining 180° sector is composed of a plurality of alternate opaque and transparent sectors or spokes.

Therefore while there have been described what are at present considered to be the preferred embodiments of the invention, I desire the scope of the invention to be limited only by the appended claims.

I claim:
1. A reflector for dual frequency conical scan systems, said reflector comprising a body portion which is substantially transparent to energy at one of the two frequencies of the dual frequency system, said body portion being adapted for rotation about an axis, said body portion having a concave surface and a convex surface, each of said surfaces having a focal point which lies on a first side of said body portion, the focal point of at least one of said surfaces lying off said axis, means on said convex surface for reflecting energy at said one frequency and means on said concave surface for reflecting energy at the other of said two frequencies while transmitting energy at said one frequency to said body portion.

2. A reflector in accordance with claim 1 in which the focal points of said concave surface and said convex surface both lie in the plane which also includes said axis.

3. A reflector in accordance with claim 1 wherein the focal points of said concave surface and said convex surface both lie in the plane which also includes said axis, said concave surface and said convex surface having different focal lengths.

4. A reflector in accordance with claim 3 wherein the focal points of said two surfaces lie on the same side of said axis.

5. A reflector in accordance with claim 2 wherein the distance from each focal point to said axis is a small fraction of the respective focal lengths of said two surfaces.

6. A reflector for dual frequency conical scan systems, said reflector comprising a body portion of circular outline which is substantially transparent to energy at one of the two frequencies of the dual frequency system, said body portion being adapted for rotation about an axis passing through the center of said circular outline, said body portion having a convex surface and a concave surface each bounded by said circular outline, each of said surfaces having a focal point which lies on a first side of said body portion and off said axis, means on said convex surface for reflecting energy at said one frequency and means on said concave surface for reflecting energy at the other of said two frequencies while transmitting energy at said one frequency to said body portion.

7. A reflector in accordance with claim 6 wherein said concave surface and said convex surface are rotationally symmetrical and wherein the axes of symmetry of said two surfaces make angles of less than 10° with said first mentioned axis.

8. A reflector in accordance with claim 7 wherein said axis of symmetry of said concave surface, said axis of symmetry of said convex surface and said axis about which said body is adapted for rotation all lie in the same plane.

9. An antenna for a dual frequency conical scan system comprising, a first support means, a reflector comprising a body portion which is substantially transparent to energy at one of the two frequencies of the dual frequency system, said body portion being mounted on said support means for rotation with respect to said first support means, said body portion having a concave surface and a convex surface, each of said surfaces having a focal point which lies on a first side of said body portion and off the axis of rotation of said body portion, means on said convex surface for reflecting energy at said one freqency and means on said concave surface for reflecting energy at the other of said two frequencies while transmitting energy at said one frequency to said body portion, and first and second energy receiving means disposed substantially on said axis of rotation for receiving energy reflected from said convex surface and said concave surface, respectively.

10. An antenna in accordance with claim 9 wherein said first and second energy receiving means are spaced apart and wherein one of said energy receiving means reflects energy at one of said two frequencies to the other of said energy receiving means.

11. An antenna in accordance with claim 10 wherein said first energy receiving means lies on said first side of said body and said second energy receiving means lies on the opposite side of said body and wherein said first energy receiving means reflects energy to said second energy receiving means.

12. An antenna for a dual frequency conical scan system comprising a tubular first support means, a reflector comprising a body portion having a circular outline, said body portion being formed of a material which is transmissive of microwave frequency energy, said body portion being mounted on said tubular support means for rotation about the axis of symmetry of the tubular support means, said body portion having a convex surface and a concave surface each bounded by said circular outline, each of said surfaces being centered on the axis of rotation of said body member, each of said surfaces having a focal point which lies in a plane which also includes said axis, means on said convex surface for reflecting microwave frequency energy, and means on said concave surface for reflecting infra-red frequency energy while transmitting energy at microwave frequencies, a microwave energy receiving means and an infra-red energy receiving means disposed substantially on said axis of rotation of said body means, said infra-red energy receiving means being disposed substantially within said tubular support means, said microwave energy receiving means including means for reflecting infra-red energy received from said concave surface to said infra-red energy receiving means.

No references cited.